United States Patent Office 3,799,784
Patented Mar. 26, 1974

3,799,784
ULTRASONIC DELAY LINE GLASS
Syozo Takeuchi, Kanagawa, Japan, assignor to Fuji Photo Film Co., Ltd., Kanagawa, Japan
Continuation-in-part of abandoned application Ser. No. 86,381, Nov. 2, 1970. This application Aug. 14, 1972, Ser. No. 280,299
Claims priority, application Japan, Oct. 31, 1969, 44/87,347
Int. Cl. C03c 3/08, 3/10, 3/30
U.S. Cl. 106—53
2 Claims

ABSTRACT OF THE DISCLOSURE

An ultrasonic solid delay line glass having the composition, in mole percent, consisting of $SiO_2$ 54 to 65%; $B_2O_3$ 17 to 28%; $SiO_2+B_2O_3$ 79 to 85%; $Al_2O_3$ 3 to 6%; $R_2O$ 3 to 10%; and PbO 6 to 13%, and having a low temperature coefficient of delay time at about ordinary temperatures, in which said $R_2O$ may be substituted by at least one metal oxide selected from the group consisting of CaO and MgO, such that the composition still contains 3% $R_2O$ and in which said PbO may be substituted by at least one metal oxide selected from the group consisting of $Bi_2O_3$, $ZrO_2$ and BaO, in an amount of 0 to 8%, 0 to 4% and 0 to 6%, such that the composition still contains 5% PbO, and R represents at least one alkali metal is disclosed.

CROSS REFERENCES TO RELATED APPLICATIONS

This application is a continuation-in-part application of copending application Ser. No. 86,381, filed Nov. 2, 1970, now abandoned.

BACKGROUND OF THE INVENTION

Field of the invention

The present invention relates to a glass composition used as an ultrasonic delay line. More particularly, the present invention relates to a boric acid-silica glass used as an ultrasonic delay line for radar, color television, video devices and the like.

DESCRIPTION OF THE PRIOR ART

Ultrasonic solid delay lines have recently been employed for radar, color television, video devices and the like. As materials for these ultrasonic solid delay media, there have been hitherto used quartz glass, alkali-lead-silica glass and the like (see, for example, U.S. Pat. 3,154,425). However, an alkali-lead-silica glass has poor melting properties, and hence it has been difficult to produce. The glass according to the present invention consists of a composition which is different from these known glasses and is practically useful as an ultrasonic delay line.

The variation in delay time with temperature of an ultrasonic delay time must be small, and thus, for example, in a PAL color television system, a time variation of only within ±5 nano-seconds with a temperature variation of from 10 to 40° C. is permissible with respect to a delay time of 63.9 μsec. corresponding to 1H (i.e., the scanning time per one horizontal line on a TV-Brown tube).

An object of the present invention is to provide a novel glass having good characteristics for ultrasonic delay lines.

Another object of this invention is to provide a novel glass composition of ultrasonic delay lines, which does not cause a disadvantage to wave velocity and ultrasonic loss and has a small variation in delay time with temperature at ordinary temperatures.

The present invention provides a glass useful as a delay line having a temperature coefficient satisfactory for these conditions and one which has useful values of energy loss and frequency properties.

These and other objects of this invention will become apparent from an examination of the specification and claims which follow.

SUMMARY OF THE INVENTION

This invention provides an ultrasonic solid delay line glass having the composition, in mole percent, consisting of $SiO_2$ 54 to 65%; $B_2O_3$ 17 to 28%; $SiO_2+B_2O_3$ 79 to 85%; $Al_2O_3$ 3 to 6%; $R_2O$ 3 to 10%; and PbO 6 to 13%, hand having a low temperature coefficient of delay time at about ordinary temperatures, in which said $R_2O$ may be substituted by at least one metal oxide selected from the group consisting of CaO and MgO, such that the composition still contains 3% $R_2O$ and in which said PbO may be substituted by at least one metal oxide selected from the group consisting of $Bi_2O_3$, $ZrO_2$ and BaO, in an amount of 0 to 8%, 0 to 4% and 0 to 6%, such that the composition still contains 5% PbO, and R represents at least one alkali metal.

BRIEF DESCRIPTION OF THE ACCOMPANYING DRAWINGS

DESCRIPTION OF THE PREFERRED EMBODIMENTS

In this specification, all percents are based on the total amount of the glass.

Figure 1:
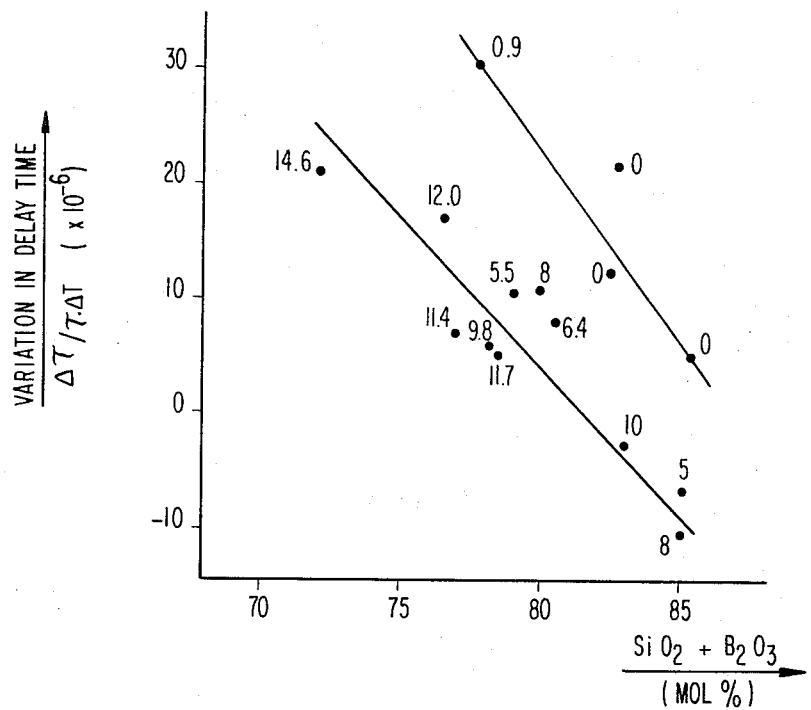
FIG. 1 shows the relationship between ($SiO_2+B_2O_3$) content and the variation in delay time with the change in temperature.

Referring now to the accompanying drawings in greater detail, FIG. 1 shows the relationship between the sum of ($SiO_2+B_2O_3$) content of the glass and the temperature variation of the delay time. As the delay line used for the PAL (phase alternation by line )system, the T.C.D. of the delay line must be within the range of ±3. The glasses shown in FIG. 1 considerably differ from each other in composition. The numerals in FIG. 1 show the mol percent of PbO (partly including $Bi_2O_3$, BaO and $ZrO_2$). It can be understood from FIG. 1 that the sum of the ($SiO_2+B_2O_3$) content greatly influences the value of the T.C.D., and that, where the sum of the ($SiO_2+B_2O_3$) content is the same, the T.C.D. changes in the negative direction with an increase in the amount of PbO.

Figure 2:
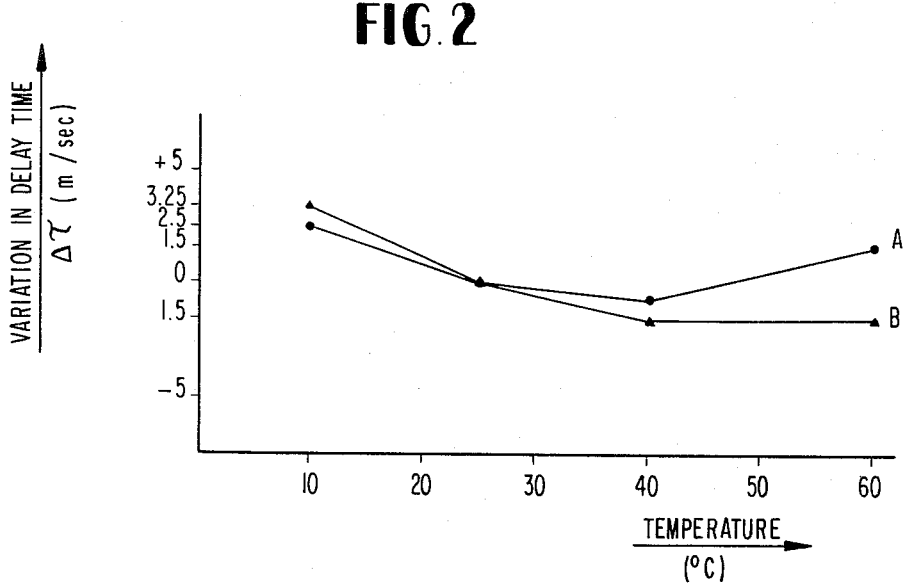
FIG. 2 shows the variation in delay time with the change in temperature.

In glasses practically used as a delay line, the temperature variation of the delay time often has a minimum value as shown in FIG. 2. FIG. 2 shows the delay time variation (ΔT), on the basis of 20° C., of delay line having a central frequency of 4.433619 mHz. and a delay time (T) of 63.943 μsec.

In example A of FIG. 2, the variation in the delay time, T.C.D., was calculated as follows.

$$T.C.D. = \frac{(1.5-2.5)\times 10^{-9}}{63.943\times 10^{-6}\times (60-10)} = \frac{-1.0\times 10^{-6}}{0.63943\times 5}$$

$$= 0.3\times 10^{-6}$$

In Example B of the FIG. 2, the variation in the delay time T.C.D., was calculated as follows.

$$T.C.D. = \frac{(-1.5-3.2)\times 10^{-9}}{63.943\times 10^{-6}\times (60-10)} = \frac{-4.7\times 10^{-6}}{0.63943\times 5}$$

$$= -1.5\times 10^{-6}$$

The total quantity of glass-forming oxide; i.e., $SiO_2$ and $B_2O_3$ is substantially related to the temperature coefficient. Thus, if the sum ($SiO_2+B_2O_3$) is not within the above-mentioned value, the temperature coefficient of the glass becomes large. The optimum total quantity of $SiO_2$ and $B_2O_3$ may be influenced by the kinds of other glassmodifying oxides and, in general, the larger the quantity of PbO, the smaller the total quantity of $SiO_2$ and $B_2O_3$ becomes, and on the contrary, the larger the quantity of alkali oxide, $R_2O$, the larger the optimum total quantity of $SiO_2$ and $B_2O_3$ becomes.

If the total quantity is within the foregoing range, the respective amounts of $SiO_2$ and $B_2O_3$ may properly be varied within the stated limits.

Consequently, the aforesaid limits are determined in view of the major considerations of melting, formability and the chemical durability of the glass.

It is, of course, natural that of the proportion of $SiO_2$ to $B_2O_3$ is varied, the ultrasonic property of the glass may also be somewhat varied.

The addition of $Al_2O_3$ prevents the phase separation of $SiO_2$ and $B_2O_3$ and the proper amount thereof is 3–6 mole percent.

The alkali oxide, $R_2O$, is also added to lower the melting temperature of the glass. In a case where the content of $SiO_2$ and $B_2O_3$ and the content of $Al_2O_3$ are within the foregoing ranges, if the balance is $R_2O$, it is possible to form a glass delay medium having a desirable temperature coefficient but in general, the ultrasonic wave loss in the glass becomes larger with the increase of the $R_2O$ content. Therefore, it is desirable to control the proportion of $R_2O$ to such an extent so as to satisfy the necessity of lowering the melting point of the glass and introduce PbO instead.

The PbO influences the propagated velocity and the ultrasonic wave loss; that is, if the quantity of PbO is increased, the propagated velocity is lowered and the dimensions of the delay line are reduced, thereby making the ultrasonic wave loss low.

A part of the PbO may also be replaced with oxides of heavy metals such as $Bi_2O_3$, $ZrO_2$ and BaO, such that the composition still contain 5% PbO, but the replacement of PbO with BaO makes the ultrasonic loss high. However, replacement of a part of the PbO with either $Bi_2O_3$, $ZrO_2$ or BaO is not advantageous. In ordinary manufacturing, since replacement of the PbO with BaO makes the ultrasonic loss high, only up to 6 mole percent of the PbO can be replaced with BaO. In addition, although the chemical durability is improved to some extent since the replacement of the PbO with $ZrO_2$ results in a glass composition which is difficult to melt, only up to 4 mole percent of the PbO can be replaced with $ZrO_2$. Further, even though a relatively large amount of $Bi_2O_3$ can be added to the composition, because no undesirable deterioration results, since $Bi_2O_3$ is expensive, only up to about 8 mole percent of the PbO should be replaced with $Bi_2O_3$. Replacement with an excess amount of $Bi_2O_3$ may cause corrosion of the platinum pot used for melting, and hence it is not very advantageous from an industrial standpoint. Furthermore, it is possible to replace a part of the $R_2O$ with CaO, MgO, etc. However, although replacing the $R_2O$ with CaO and MgO does not deleteriously influence the delay line properties of the glass, it renders the melting of the glass difficult and therefore 3 mole percent of $R_2O$ must be present in the glass composition. Replacement of $R_2O$ with CaO or MgO improves the chemical durability to some extent. If necessary, the addition of less than 1 weight percent of such fining agents as $As_2O_3$ and $Sb_2O_3$ may also be permissible.

The resulting glasses are transparent. Therefore, any interior defects in the glasses such as foams and cords can be discovered with the naked eye. However, the addition of coloring agents such as $Co_3O_4$, $Mn_3O_4$, etc. thereto will decrease the transparency, and it will become difficult to observe the interior defects of the glasses. Accordingly, the addition of such coloring agents should be avoided so as to obtain an ultrasonic delay line without any interior defects.

The glass of the present invention can be produced in accordance with a conventional process, for example, as shown in U.S. Pat. No. 3,154,425. For example, the glass composition is melted at about 1400° C. and fired with sufficient stirring so as to form neither bubbles nor cord.

The melting can usually be carried out in a pot furnace but a tank furnace may be used to conduct the melting and forming of the glass continuously.

The forming is generally carried out in any one of the known glass forming processes such as a casting process for a large size block, a continuous roll process, a press process and the like (see, for example, the "Glass Engineering Handbook" by E. B. Shand, published by McGraw-Hill Book Company). A chunk glass according to a large size block casting process or continuous roll process is made into the desired shape by cutting, pressing and grinding.

The glass material formed is then subjected to annealing by a method which is conventional for an optical glass. More specifically, the glass material is heated to the annealing temperature or to a temperature slightly higher (i.e., by 20° C.–30° C.) than the annealing temperature and maintained at that temperature until any strain is removed, i.e., for at least 5 hours, usually 24 hours. The glass, thereafter, is cooled at a rate not higher than 5° C./hr., and it is preferable, to obtain good results, to continue the cooling to a temperature as low as possible. Thus, for example, the cooling can be continued to a temperature of about 200° C. to secure excellent effects.

The present invention will be illustrated in greater detail by reference to the following non-limiting examples.

EXAMPLES

A square glass bar (12 x 12 x 180 mm.) was obtained as follows:

Each of the glass compositions shown in Table 1 below was heated up to about 1400° C. to be melted in a plantinum furnace and successively the melt was subjected to casting. The casted block was cut and ground to form the same into a bar. The thus-obtained bar was reheated to about 500° C. for annealing purposes, and the bar was then cooled at the rate of 5–3° C./hr. until it was cooled to 200° C., and thereafter allowed to cool naturally in furnace. Ultrasonic transducers (lead-zirconate-titanate, shear wave mode, 4 mHz., 10 mm. x 5 mm.) were attached to both ends of the bar by epoxy resin adhesive, and measurements of various physical properties were performed. Table 1 shows the compositions of the various glass bars tested as well as the results of those tests.

TABLE 1

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| $SiO_2$ | 54–65 | 56 | 62 | 55.0 | 56.5 | 63.3 | 62.2 | 55 | 55 | 60 | 65.1 | 56 | 71.2 | 71.9 |
| $B_2O_3$ | 17–28 | 26 | 20 | 26.6 | 26.0 | 17.0 | 19.8 | 30 | 28 | 19 | 17.5 | 29 | 11.6 | 9.8 |
| $SiO_2 + B_2O_3$ | 79–85 | 82 | 82 | 81.6 | 82.5 | 80.3 | 82.0 | 85 | 83 | 79 | 82.6 | 85 | 82.8 | 81.7 |
| $Na_2O$ | | 2 | 2 | 1.9 | 2.0 | 4.2 | 2.0 | 4 | 2 | | 6.8 | 1 | | |
| $K_2O$ | | 2.5 | 2.5 | 2.9 | 3.0 | 4.2 | 1.6 | 4 | 3 | 12.5 | 9.0 | 3 | 5.2 | 6.2 |
| $R_2O$ | 3–10 | 4.5 | 4.5 | 4.8 | 5.0 | 8.4 | 3.6 | 8 | 5 | 12.5 | 15.8 | 4 | 5.2 | 6.2 |
| $Al_2O_3$ | 3–6 | 4 | 4 | 3.9 | 3.0 | 3.4 | 3.0 | 2 | 2 | 3 | | 3 | 2.0 | 3.5 |
| PbO | 6–13 | 6 | 8 | 7.7 | 9.5 | 6.5 | 9.0 | 5 | 10 | 5.5 | | 8 | 10.0 | 8.6 |
| $ZrO_2$ | | | 2 | | | | | | | | | | | |
| $Bi_2O_3$ | | | | | | 1.4 | | | | | | | | |
| CaO | | | | | | | 2.4 | | | | | 1.6 | | |
| BaO | | 1.5 | 1.5 | | | | | | | | | | | |
| T.C.D.[1] | | +1.6 | +1.7 | −1.0 | +2.1 | +2.8 | +3.2 | −6.6 | −2.9 | +10.5 | +12.2 | −10.3 | +1.6 | +1.2 |
| Loss, db | | 15.2 | 16.8 | 11.0 | 15.2 | 14.7 | 14.2 | 13.5 | 15 | 21 | 23.5 | 14.7 | 13.9 | 14.7 |
| Velocity of sound m./sec. | | 2,960 | 2,990 | 2,910 | 2,900 | 2,930 | 2,880 | 3,110 | 2,960 | 3,270 | 3,730 | 3,010 | 2,970 | 2,930 |

[1] Temperature coefficient of delay (time).

The loss (ultrasonic) shown in the table is an apparent value including losses by transducers and adhesive on both ends.

The glass composition in the table is given in molar percent, and the thermal change of delay time represented by T.C.D. shows an average temperature variation of 10° C.–60° C. as p.p.m./° C.

Examples 1 to 6 are in accordance with the present invention while 7 to 13 are comparative examples. In these Examples 1 to 6, the $SiO_2+B_2O_3$ is within the range of this invention.

Examples 1 and 2 show the results achieved when a portion of the PbO is replaced with BaO and $ZrO_2$ and a part of the PbO is replaced with BaO, respectively.

In Examples 12 and 13, although the temperature coefficient of the delay time is good, when the $SiO_2$ content is as large and the $B_2O_3$ content is as small as in these examples, the melting property of the glasses are so poor that they are difficult to produce.

Example 10 shows the case in which the PbO content is 0. In such a case, the temperature coefficient of the delay time is not very good. In addition, the loss becomes large due to the large content of $R_2O$, and the wave velocity also becomes great due to the absence of PbO. Since the form of the delay line will become large with the increase in wave velocity, this is disadvantageous.

Additionally, although the glass described in U.S. Pat. No. 2,949,376 contains $SiO_2$, $Al_2O_3$, $B_2O_3$, PbO, alkaline oxide, $Co_3O_4$, $Mn_3O_4$, alkaline earth oxide and $TiO_2$, as is apparent from the examples described therein, these $SiO_2+B_2O_3$ contents convert, in mol percent, to 69.43%, 77.02% and 72.68%, respectively. It will be clear from the above-described comparative examples that it is impossible to use the glass composition containing above-stated amount of $SiO_2+B_2O_3$ as a glass for ultrasonic delay lines.

What is claimed is:

1. An ultrasonic solid delay line glass having a temperature coefficient of delay time within the range of about $-0.3\times10^{-6}$ to $+0.3\times10^{-6}$ and having the composition, in mole percent, consisting of $SiO_2$ 54 to 65%; $B_2O_3$ 17 to 28%; $SiO_2+B_2O_3$ 79 to 85%; $Al_2O_3$ 3 to 6%; $R_2O$ 3 to 10%; and PbO 6 to 13%, and having a low temperature coefficient of delay time at about ordinary temperatures, in which said $R_2O$ may be substituted by at least one metal oxide selected from the group consisting of CaO and MgO, such that the composition still contains 3% $R_2O$ and in which said PbO may be substituted by at least one metal oxide selected from the group consisting of $Bi_2O_3$, $ZrO_2$ and BaO, in an amount of 0 to 8%, 0 to 4% and 0 to 6%, respectively, such that the composition still contains 5% PbO, and R represents at least one alkali metal.

2. The glass composition of claim 1 wherein fining agents of $As_2O_3$ or $Sb_2O_3$ are added to the composition in an amount of less than 1 weight percent, based on the weight of said composition.

References Cited

UNITED STATES PATENTS

| | | | |
|---|---|---|---|
| 2,525,536 | 10/1950 | Faatz et al. | 106—53 |
| 2,949,376 | 8/1960 | Comer | 106—53 |
| 3,258,351 | 6/1966 | Paymal | 106—53 |
| 3,475,704 | 10/1969 | Van Der Burgt | 333—30 R |

FOREIGN PATENTS

| | | | |
|---|---|---|---|
| 417,297 | 1947 | Italy | 106—53 |

ALLEN B. CURTIS, Primary Examiner

M. L. BELL, Assistant Examiner

U.S. Cl. X.R.

106—54